(12) United States Patent
Olsson et al.

(10) Patent No.: US 8,135,972 B2
(45) Date of Patent: Mar. 13, 2012

(54) DATA INTERFACE POWER CONSUMPTION CONTROL

(75) Inventors: Fredrik Olsson, Los Altos, CA (US); Shawn Lawrence Scouten, Ottawa (CA); Ryan Patrick Donohue, Sunnyvale, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 384 days.

(21) Appl. No.: 12/401,020

(22) Filed: Mar. 10, 2009

(65) Prior Publication Data
US 2010/0235663 A1 Sep. 16, 2010

(51) Int. Cl.
*G06F 1/32* (2006.01)
(52) U.S. Cl. ............ 713/324; 713/320; 713/323
(58) Field of Classification Search .......... 713/324, 713/320, 323
See application file for complete search history.

(56) References Cited

U.S. PATENT DOCUMENTS

| | | | |
|---|---|---|---|
| 5,150,247 A | 9/1992 | Sharpe et al. | |
| 6,260,150 B1 | 7/2001 | Diepstraten et al. | |
| 6,263,448 B1 | 7/2001 | Tsern et al. | |
| 6,292,322 B1 | 9/2001 | Haraguchi | |
| 6,498,794 B1 | 12/2002 | Tsukamoto et al. | |
| 6,594,262 B1 | 7/2003 | Kwon et al. | |
| 6,618,791 B1 | 9/2003 | Dodd et al. | |
| 6,700,900 B1 | 3/2004 | Turban | |
| 6,701,446 B2 | 3/2004 | Tsern et al. | |
| 6,718,491 B1 | 4/2004 | Walker et al. | |
| 6,735,669 B2 | 5/2004 | Shin | |
| 6,745,336 B1 | 6/2004 | Martonosi et al. | |
| 6,907,044 B1 | 6/2005 | Yonge et al. | |
| 6,931,009 B1 | 8/2005 | Agarwal | |
| 6,957,353 B2 | 10/2005 | Bresniker et al. | |
| 7,000,065 B2 * | 2/2006 | Wilcox et al. | 711/105 |
| 7,031,343 B1 | 4/2006 | Kuo et al. | |
| 7,058,826 B2 | 6/2006 | Fung | |
| 7,181,635 B2 * | 2/2007 | Byrne et al. | 713/323 |
| 7,320,082 B2 | 1/2008 | Tsern et al. | |
| 7,716,506 B1 * | 5/2010 | Surgutchik et al. | 713/321 |
| 7,805,621 B2 * | 9/2010 | Kendall et al. | 713/300 |
| 7,908,502 B2 * | 3/2011 | Park | 713/324 |
| 7,953,992 B2 * | 5/2011 | Lee et al. | 713/300 |
| 2002/0194415 A1 | 12/2002 | Lindsay et al. | |
| 2004/0008794 A1 | 1/2004 | McClellan | |
| 2004/0052528 A1 | 3/2004 | Halgren et al. | |

(Continued)

OTHER PUBLICATIONS

International Search Report and Written Opinion for PCT Application Serial No. PCT/US2010/26335, dated Jun. 17, 2010, 12 pages.

(Continued)

*Primary Examiner* — Glenn A Auve (57) ABSTRACT

Apparatus and techniques relating to data interface power consumption control are disclosed. Components of a data transfer module may be selectively moved between their normal operating states and reduced power states at times when the data transfer module is not to be used for transferring data. Decisions as to particular components that are to be moved to their reduced power states may be based on respective timing characteristics of the components and/or respective power consumption characteristics of the components, for example. In some embodiments, an action may be performed to reduce a powering up time of the data transfer module when normal operation of the data transfer module is to resume. In the case of a multiple-connection interface having respective data transfer modules for each connection, the interface may be partially shut down by moving a subset of the data transfer modules into reduced power states.

39 Claims, 5 Drawing Sheets

U.S. PATENT DOCUMENTS

| | | |
|---|---|---|
| 2004/0081081 A1 | 4/2004 | Colombo |
| 2004/0148533 A1 | 7/2004 | Nicholas |
| 2004/0196847 A1 | 10/2004 | Kuwabara |
| 2005/0138432 A1 | 6/2005 | Ransom et al. |
| 2006/0165099 A1 | 7/2006 | Doherty et al. |
| 2006/0285847 A1 | 12/2006 | McCall et al. |
| 2007/0022309 A1 | 1/2007 | Adamo et al. |
| 2007/0116026 A1 | 5/2007 | Huang et al. |
| 2007/0266270 A1* | 11/2007 | Ito .................................. 713/324 |
| 2007/0288784 A1* | 12/2007 | Koper et al. ................... 713/324 |
| 2008/0040562 A1 | 2/2008 | Gower et al. |
| 2008/0040563 A1 | 2/2008 | Brittain et al. |
| 2008/0059829 A1 | 3/2008 | Boskovic |
| 2008/0109670 A1 | 5/2008 | Johansson et al. |
| 2008/0140631 A1 | 6/2008 | Pandya |
| 2008/0140661 A1 | 6/2008 | Pandya |
| 2009/0187780 A1* | 7/2009 | Keohane et al. .............. 713/324 |
| 2010/0115309 A1* | 5/2010 | Carvalho et al. .............. 713/320 |

OTHER PUBLICATIONS

Cam, Richard et al., "System Packet Interface Level 4 (SPI-4) Phase 2 Revision 1: OC-192 System Interface for Physical and Link Layer Devices", OIF-SPI-4-02.1, Optical Internetworking Forum (OIF), Oct. 15, 2003.72 pages.

Advisory Action mailed Feb. 19, 2010 for U.S. Appl. No. 11/349,212, 4 pages.

Final Office Action mailed Oct. 29, 2009 for U.S. Appl. No. 11/349,212, 51 pages.

Non-Final Office Action mailed Mar. 4, 2009 for U.S. Appl. No. 11/349,212, 92 pages.

US 7,366,920, 04/2008, Jeddeloh et al. (withdrawn)

* cited by examiner

DATA INTERFACE POWER CONSUMPTION CONTROL

FIELD OF THE INVENTION

This invention relates generally to data transfer and, in particular, to reducing power consumption of data interfaces.

BACKGROUND

A data interface is not typically in use to transfer data to its full capacity at all times. Even when not actively engaged in transferring data, however, a data interface may still consume power. For example, components of a data interface may be continuously supplied with power so that the interface is ready to resume operation or to support a higher rate of data transfer when data is to be transferred after a period of inactivity or reduced activity.

BRIEF DESCRIPTION OF THE DRAWINGS

Illustrative embodiments will now be described in greater detail with reference to the accompanying drawings.

DETAILED DESCRIPTION OF PREFERRED EMBODIMENTS

Various mechanisms for reducing power consumption by inactive data interfaces have been proposed. These mechanisms tend to be suited to particular types of interfaces or interfaces which are used to carry out only particular types of functions. Thus, there remains a need for improved power consumption control mechanisms for data interfaces.

According to an aspect, components of a data interface are selectively powered down during periods of inactivity. Component selectivity could potentially be dynamic, and based on any of multiple criteria. For instance, where a data interface includes multiple physical connections, different numbers of connections might be moved into a lower power state under different conditions of recent data transfer history, current data transfer levels, Quality of Service (QoS) requirements, data priorities, latency, etc. The same or different criteria may be applied in controlling transitions back to a normal operating state.

Selectivity could also or instead be applied in respect of a type of lower power state into which each connection is moved. Some connections could remain in an on state, others could be moved into a lower power but partially on state, and still others might be powered down entirely.

In at least some applications, the time required for an interface to return to a normal operating state from a lower power state can be important, since the transition time introduces a delay before data transfer at a higher rate or full capacity can begin. In accordance with another aspect, actions are taken to reduce this transition time. Examples of such actions include storing parameters that are used by certain components to be powered down and subsequently retrieving the stored parameters during the transition back to normal operating state, and periodically powering up components that have been powered down.

A further aspect involves partially disabling a multi-connection interface, such that at least one connection remains in a normal operating state to provide for transfer of control information, and possibly data. Control information might be transferred on the operating connection(s), for example, to initiate actions at a remote end of the connection(s) to bring remote end components of other connections of the interface back to their normal operating states.

Figure 1:
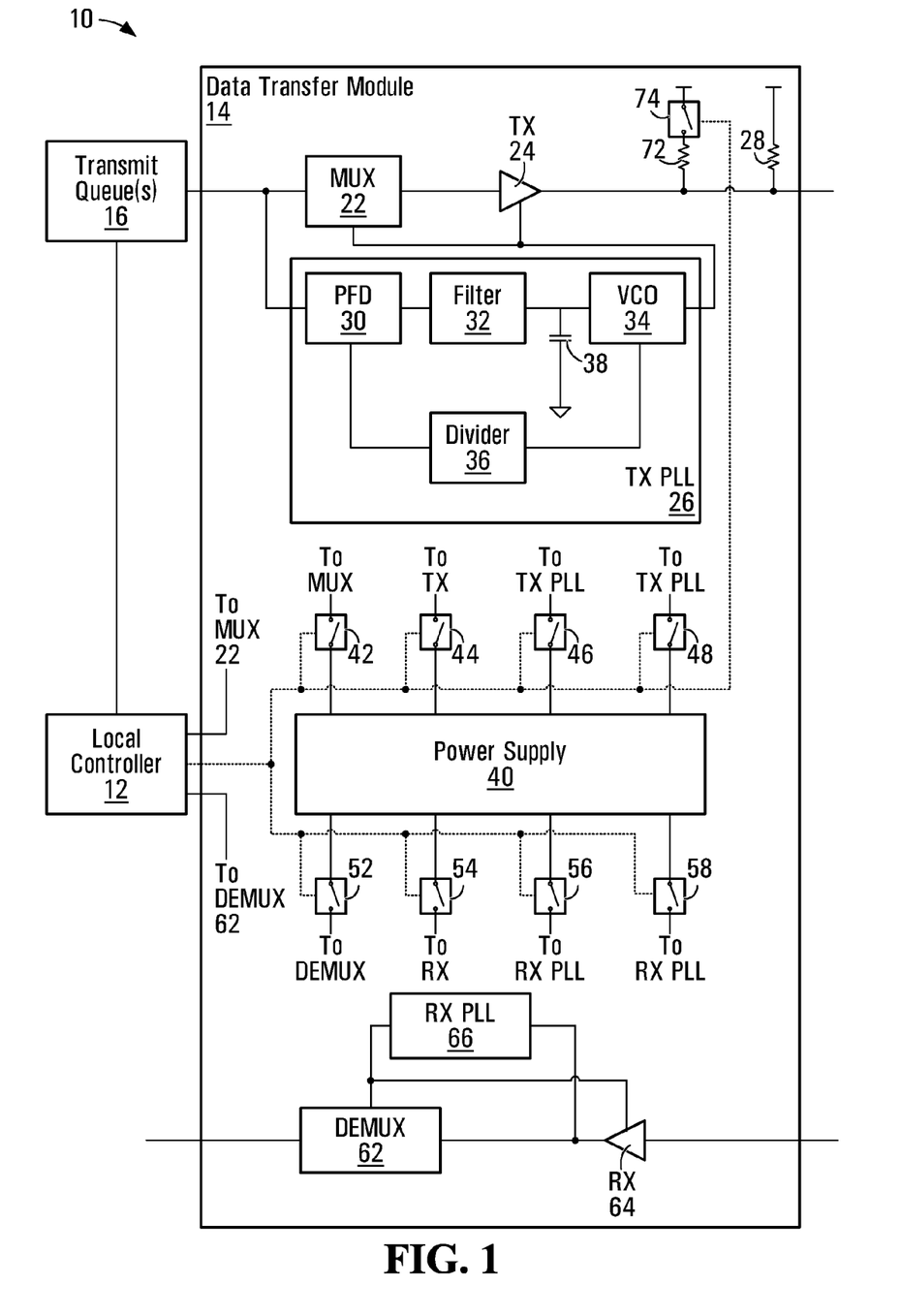
FIG. 1 is a block diagram of an example apparatus according to an embodiment.

FIG. 1 is a block diagram of an example apparatus according to an embodiment. The apparatus 10 includes a local controller 12, one or more transmit queues 16, and a data transfer module 14 operatively coupled to the local controller and to the transmit queue(s).

Within the data transfer module 14, a multiplexer (MUX) 22 is operatively coupled to the transmit queue(s) 16 and to a transmitter or driver 24. A termination resistor 28, a switched resistor 72, and a switch 74 are operatively coupled to the transmit connection at the output of the transmitter 24.

A transmit clock reference is provided in the example shown by a transmit Phase Lock Loop (PLL) 26. A phase/frequency detector (PFD) 30 is operatively coupled to the transmit queue(s) 16, to a filter 32, and to a divider 36. A controllable oscillator, in the form of a voltage-controlled oscillator (VCO) 34 in the example shown in FIG. 1, is operatively coupled to the filter 32 and to the divider 36 in the transmit PLL 26, and is also operatively coupled to the MUX 22 and the transmitter 24, which may use the transmit clock reference during operation. A capacitor 38 is also operatively coupled to the filter 32.

Power consumption control in the apparatus 10 is implemented through control of power being supplied to various components. Switches 42, 44, 46, 48 control the supply of power from the power supply 40 to transmit circuit components, and switches 52, 54, 56, 58 control the supply of power from the power supply to receive circuit components, which include a receiver 64, a demultiplexer (DEMUX) 62, and a receive PLL 66, interconnected as shown. The receive PLL 66 has substantially the same structure as the transmit PLL 26 in some embodiments.

Although only certain components have been explicitly shown in FIG. 1 in order to avoid congestion in the drawing, devices such as communication equipment in which or in conjunction with which embodiments may be implemented might include additional components which have not been shown. Other implementations of the components shown in FIG. 1, such as the data transfer module 14 and/or the PLLs 26, 66 are also contemplated. It should therefore be appreciated that the apparatus 10, as well as the contents of the other drawings, are intended solely for illustrative purposes, and that the present invention is in no way limited to the particular example embodiments explicitly shown in the drawings and described herein.

Many of the components of the apparatus 10 represent components that are used in communications circuits or interfaces. For example, various forms of queues, multiplexers, transmitters, PLLs, receivers, demultiplexers, and power supplies, are commonly used.

The local controller 12 and the components it controls, however, are involved in providing new power saving features. The various control functions disclosed herein may be implemented, for example, using hardware, firmware, one or more processors executing software, computer-readable storage storing software, or some combination thereof. Microprocessors for executing software stored on a computer-readable medium, Application Specific Integrated Circuits (ASICs), Programmable Logic Devices (PLDs), and Field Programmable Gate Arrays (FPGAs) are examples of devices that might be suitable for implementing the local controller 12. Given such a broad range of possible implementations, the local controller 12 is described below primarily in terms of its functions.

There may also be variations in the way the controllable switches 42, 44, 46, 48, 52, 54, 56, 58, 74 are implemented in different embodiments. The symbol used for these switches in FIG. 1 is a generic switch symbol, and should not be taken as an indication that a particular type of switch is necessary, or that all switches are to be implemented using the same type of switch. For example, although the switch symbol used in FIG. 1 shows a switch blade, other types of switches, including solid state switch elements such as transistors, might be used to implement any or all of the switches 42, 44, 46, 48, 52, 54, 56, 58, 74.

Considering the actual interconnections between the components shown in FIG. 1, these may, at least to some extent, be implementation-dependent. Physical connections such as traces on an electronic circuit card, other types of wired connections, and wireless connections, as well as logical connections between components through shared memory areas or registers, represent examples of operative couplings that may be provided in embodiments. Control connections are shown in FIG. 1 in dashed lines in the interest of clarity.

In operation, the data transfer module 14 enables transfer of data from and to the apparatus 10. While the data transfer module 14 enables both transmission and reception of data, both directions of data transfer need not necessarily be supported in all embodiments. For instance, a data transfer module might enable data to be transmitted but not received, or might enable data to be received but not transmitted. Embodiments could potentially be implemented with unidirectional or bidirectional data transfer.

The data transfer module 14 includes components that have respective timing characteristics associated with transitions of each component between a reduced power state and a normal operating state. The transmitter 24, for example, might have a powering up time or "turn on" time to start or resume operation on the order of tens of nanoseconds, whereas the turn on time for the VCO 34 in the transmit PLL 26 might be significantly longer.

The local controller 12 determines whether the data transfer module 14 is currently to be used in actually transferring data. If not, the local controller 12 selectively moves one or more components of the data transfer module 14 into their reduced power states based on the respective timing characteristics. This involves controlling the power switches 42, 44, 46, 48, 52, 54, 56, 58 in the example shown.

Timing characteristics that are used in selectively moving components into reduced power states might be indicative of powering up or turn on times associated with moving each component from its reduced power state to its normal operating state. The actual supply of power from the power supply 40 to a component can be substantially simultaneous with the closing of one of the switches 42, 44, 46, 48, 52, 54, 56, 58. However, a component may require additional time to actually become operational. In some embodiments, the local controller 12 selectively moves components of the data transfer module 14 having powering up times that are less than a threshold into their reduced power states.

Powering down times that are required to move each component from its normal operating state to its reduced power state might also be taken into account for the purposes of selectively moving components into their reduced power states. Some types of components might require a certain amount of time after being turned off before they may be turned on again, for instance. The local controller 12 might then selectively move components of the data transfer module 14 having respective total powering down and powering up times that are less than a threshold into their reduced power states.

The powering up threshold and/or the total powering up/down threshold used by the local controller 12 may be established in accordance with a rate of data transfer by the transmitter 24. For example, a component might be turned off only if it can be shut down and started up again within a certain number of clock cycles or data periods, so as to avoid delays when data transfer is to be resumed.

Regarding the determination as to whether or not the data transfer module 14 is to be used in transferring data, any of various criteria might be used by the local controller 12. For the purposes of controlling the power consumption of transmit circuit components, the local controller 12 might determine whether the data transfer module 14 is to be used in transferring data based on one or more of: an amount of data awaiting transmission in the transmit queue(s) 16, a priority of data awaiting transmission in the transmit queue(s), latency in transmitting data, Quality of Service (QoS) requirements, and Service Level Agreement (SLA) requirements. In some embodiments, the data transfer module 14 is one of multiple modules that transmit data from the same transmit queue(s) 16. In this type of implementation, the local controller 12 might maintain the data transfer module 14 in its normal operating state for use in transferring data where high priority data is stored in the transmit queue(s) 16, but not if only low priority data is awaiting transmission.

Some embodiments support remote control of the local controller 12. The local controller 12 may then determine whether the data transfer module 14 is to be used in transferring data based on control information received from a further controller. The further controller might be the local controller of a data transfer module at the far end of the receive connection to which the receiver 64 is operatively coupled. In this case, the local controller 12 receives control information from the further controller through the receiver 64 and the DEMUX 62. This type of mechanism could be used to cause the local controller 12 to move receive circuit components into their reduced power states when the local controller at a transmit end of a connection will be moving components of a transmit circuit for that connection into their reduced power states.

A similar remote control mechanism could be applied in the opposite direction by the local controller 12. If the local controller 12 determines that the data transfer module 14 is not to be used in transferring data, then it may transmit control information to a remote controller to cause that remote controller to move a receive circuit that is operatively coupled to the transmitter 24 into a reduced power state.

Figure 2:
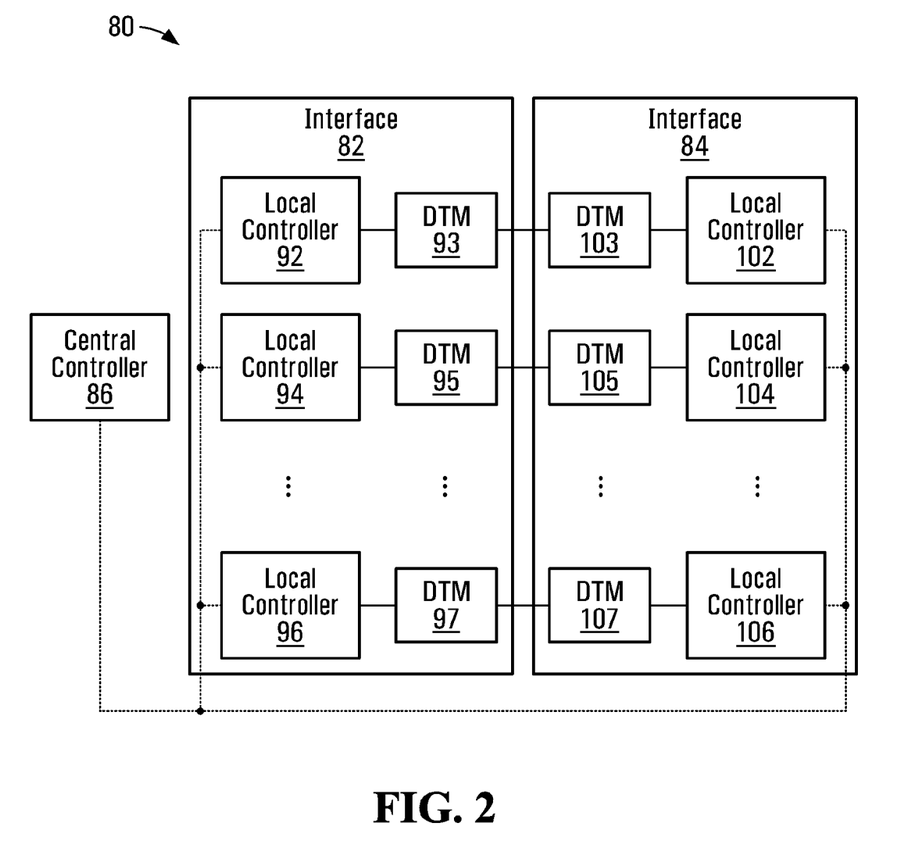
FIG. 2 is a block diagram of an example apparatus according to a further embodiment.

Local controllers at each end of a connection may thus coordinate with each other to disable data transfer on a connection, thereby reducing power consumption. Coordination at a higher level is also contemplated. FIG. 2 is a block diagram of an example apparatus according to a further embodiment.

The apparatus 80 includes a central controller 86 and multi-connection interfaces 82, 84. Each of the interfaces 82, 84 includes multiple local controllers 92/102, 94/104, 96/106 and multiple data transfer modules 93/103, 95/105, 97/107, which may be implemented in some embodiments as shown in FIG. 1. The functions of the central controller 86, like those of the local controllers 12, 92/102, 94/104, 96/106 could potentially be implemented in any of various ways.

The central controller 86 provides overall control of the local controllers 92/102, 94/104, 96/106 of the interfaces 82, 84, and the data transfer modules 93/103, 95/105, 97/107 enable transfer of data between the interfaces. Each data transfer module 93/103, 95/105, 97/107 includes components having respective timing characteristics associated with transitions of each component between a reduced power state and a normal operating state. The central controller 86 determines whether each data transfer module 93/103, 95/105, 97/107 is to be used in transferring data and selectively moves components of each data transfer module that is not to be used in transferring data into their reduced power states based on the respective timing characteristics.

Each of the local controllers 92/102, 94/104, 96/106 is responsive to the central controller 86 to selectively move components of the data transfer module 93/103, 95/105, 97/107 to which it is operatively coupled into their reduced power states if it is determined by the central controller that the data transfer module is not to be used in transferring data. Although the example shown in FIG. 2 includes respective local controllers 92/102, 94/104, 96/106 for each DTM 93/103, 95/105, 97/107, it should be appreciated that other arrangements are also possible. For example, in some embodiments each DTM 93/103, 95/105, 97/107 has its own local controller 92/102, 94/104, 96/106 to monitor the ready state (e.g., reduced power state or normal operating state) of the DTM. This state may vary from DTM to DTM while still fitting within the timing budget. Multiple local controllers 92, 94, 96 or 102, 104, 106 could potentially be grouped into a single local controller which monitors and makes decisions on a per-DTM basis in other embodiments.

The central controller 86 and the local controllers 92/102, 94/104, 96/106 perform different control functions in some embodiments. For example, the central controller 86 might determine whether each data transfer module 93/103, 95/105, 97/107 is to be used in transferring data and then transmit control information, illustratively in the form of a command, to the local controller 92/102, 94/104, 96/106 of each data transfer module that is not to be used in transferring data. The local controller 92/102, 94/104, 96/106 of each data transfer module 93/103, 95/105, 97/107 that is not be used in transferring data is responsive to the control information to selectively move components of the data transfer module into their reduced power states based on the timing characteristics. Other divisions of control functions between the central controller 86 and the local controllers 92/102, 94/104, 96/106 are also possible.

According to a "combined" approach to central and distributed or remote control, a local controller 92/102, 94/104, 96/106 that will be moving components of a transmitter in its data transfer module 93/103, 95/105, 97/107 into their reduced power states also transmits control information, possibly in the form of a command, to a local controller at the remote other end of a connection to cause the remote end local controller to move components of a receiver in its data transfer module into a reduced power state. Ultimate control of receive circuit components by the central controller 86 is thus indirect, through transmit-side local controllers 92/102, 94/104, 96/106.

After components have been moved into their reduced power states, it may be desirable to restore those components back to their normal operating states so that data transfer on a connection can resume. Data transfer on a connection might be re-enabled, for instance, when data is received for transmission on a connection, when the amount of data stored in the transmit queue(s) 16 (FIG. 1) is above a certain level, when high priority data is received, when latency is above a threshold, or there is a risk that QoS and/or SLA requirements will not be met or are currently not being met.

The thresholds that are used to determine when a data transfer module is not to be used in transferring data might also be used to subsequently determine when the data transfer module is to be re-enabled for use in transferring data. If the same thresholds are used, however, the opposite shut down and power up determinations would apply the thresholds in an opposite sense. Data transfer on a connection might be disabled when the amount of data in the traffic queue(s) 16 is below a threshold and re-enabled when the amount of data is above the same threshold, for example. It should be appreciated that different thresholds, or even different criteria entirely, could be used in making the shut down and power up determinations.

When a determination is made that a previously disabled data transfer module 14, 93/103, 95/105, 97/107 is now to be used in transferring data, the corresponding local controller 12, 92/102, 94/104, 96/106 moves components of that data transfer module, or each module in the case of a multi-connection interface, from their reduced power states to their normal operating states. Selectivity as to which components are to be moved into their reduced power states based on timing characteristics provides for control over both power consumption and delays in starting or resuming data transfer.

Depending on how the power supply 40 is implemented in each data transfer module 14, 93/103, 95/105, 97/107, the switching of power to transmit and/or receive circuit components may affect other components. Switching power to transmit circuit components off at the same time, for example, might cause a power spike. An opposite effect might be observed when switching power to those components back on. For this reason, a local controller 12, 92/102, 94/104, 96/106 could further control a sequence in which components are moved from their normal operating states to their reduced power states, a sequence in which components are moved from their reduced power states to their normal operating states, or both.

Sequencing control might not be provided in some embodiments, such as where the power supply 40 is able to handle the switching of power to transmit circuit components and/or receive circuit components while limiting power swings to within tolerable or acceptable levels. Another possible option for reducing power swings associated with switching power to components would be to add or supplement power supply filtering. A higher capacitance in power supply filtering, for example, might be sufficient to constrain short-term power supply swings to within acceptable limits. Inductance from a supply regulator, which could also result in power supply spikes, might be taken into account in some embodiments. Sense locations or regulators can potentially be located on ASIC die bumps to further control power supply variation during power switching.

The switched resistor 72 represents another possible measure that could be taken to reduce the effects of power switching. With an appropriately sized resistor 72, the switch 74 could be closed when components are being shut down in order to increase the termination resistance on the transmit connection, to thereby maintain operating bias voltages while reducing power consumption, which in turn allows for shorter settling periods when a component such as the transmit driver 24 (FIG. 1) is repowered. This may also reduce effects at the far end of the connection. In some embodiments, transmit and receive circuit components at both ends of a connection are moved into their reduced power states at roughly the same time. Therefore, a voltage spike on the connection caused by switching off power to transmit circuit components, which could be erroneously detected as a data bit by the receiver, might not be an issue.

Multi-connection interfaces such as the interfaces 82, 84 shown in FIG. 2 provide several options for connection management while still enabling control information to be exchanged between connection endpoints. For example, some implementations might provide separate control connections between the local controllers 92/102, 94/104, 96/106 in addition to the connections between the data transfer modules 93/103, 95/105, 97/107. In this case, all of the connections between the data transfer modules 93/103, 95/105, 97/107 can potentially be disabled in order to maximize power savings during periods of inactivity. This type of implementation, however, involves separate and likely dedicated control connections.

According to another aspect, the central controller 86 maintains the components of at least one of the data transfer modules 93/103, 95/105, 97/107 in their normal operating states. The open connection can then be used to transfer control information, and possibly data as well, between the local controllers 92/102, 94/104, 96/106. Such maintenance of an open connection allows control information to be transferred without requiring separate control connections, and also allows data to be transferred on one connection without re-enabling data transfer on other connections. This might be a useful feature to avoid re-enabling multiple connections when only a small amount of data such as a single packet or frame is received after other connections have been disabled.

Thus, in the example apparatus 80, each of the interfaces 82, 84 supports transmission of data over multiple connections. The central controller 86 determines whether transmission of data over any of the multiple connections can be disabled, and if so, disables transmission of data over one or more connections, maintains at least one of the connections in an enabled state for transmission of data, and transmits control information through the enabled connection to a remote interface that is operatively coupled to the interface through the multiple connections. The control information, illustratively a command, causes reception of data over the one or more connections to be disabled at the remote interface. As described above, the transmission of control information to the local controller(s) at a remote interface could be indirect, in the sense that a local controller that is instructed to disable data transmission on a connection might send control information to cause the local controller of a receiver on that connection to disable data reception.

Transmission and reception of data over a connection may subsequently be re-enabled, substantially as described above in the context of a single connection.

In some embodiments, control of the power state of each connection is implemented in hardware. Generally, hardware tends to be able to react faster than software, and accordingly hardware-implemented control may be particularly suited to applications in which shorter reaction times are desired. A hardware implementation of power state control need not be dependent on any particular control information transfer mechanism. Control hardware could be responsive to commands received over a connection that is being controlled or over a separate connection, for example.

It is to be noted that embodiments are in no way restricted to disabling data transmission or reception over a certain number of connections. Different numbers of connections might be disabled at different times or under different conditions, for example. In some embodiments, there are multiple reduced power states for transmit and/or receive circuit components, and thus connections may be disabled to different degrees. Some connections might be maintained in a normal operating state and ready to transmit and/or receive data, other connections might be moved into a lower power but partially on state so that data transfer over those connections can be resumed relatively quickly, and still others might be powered down entirely and require additional time to re-enable.

Illustrative embodiments have been described above primarily in the context of using timing characteristics as a decision criterion for selecting which components are to be moved into reduced power states when a data transfer module is not to be used in transferring data. It should be appreciated, however, that other embodiments are also contemplated.

For example, power consumption characteristics could also or instead be used to select components for powering down. In one embodiment, a controller is operative to move components of a data transfer module into their reduced power states based on their respective timing characteristics and their respective power characteristics where it is determined that the data transfer module is not to be used in transferring data. The respective power consumption characteristics might be indicative of power consumption of each component when the data transfer module is not transferring data, and/or power consumption of each component to move the component from its reduced power state to its normal operating state, for instance.

Power consumption thresholds or other selection criteria could be established to favor powering down components that have high standby power consumption, during times when a data transfer module is not transferring data, relative to other components, for example. Another possible option would be to take into account potential power savings, based on standby power consumption and the amount of power consumed during the transition of a component from its reduced power state to its normal operating state. Components which provide the greatest potential power savings can then be identified.

As described in detail above, components can be moved from their reduced power states to their normal operating states when it is subsequently determined that a data transfer module is to be used in transferring data. The sequence in which components are moved from their reduced power states to their normal operating states could also be controlled based on the respective power consumption characteristics.

Other parameters and criteria for controlling the states of data transfer module components may be or become apparent.

Since components of transmit and/or receive circuits are being powered down in order to reduce power consumption, it may be desirable to take action to reduce the powering up time of these components from their reduced power states to their normal operating states. To this end, a controller 12, 86, 92/102, 94/104, 96/106 might perform such an action when it determines that a data transfer module 14, 93/103, 95/105, 97/107 is not currently to be used in transferring data.

One example of this type of action would be storing one or more parameters used by a component of a data transfer module prior to moving the data transfer module from its normal operating state to a reduced power state. These parameters could then be retrieved when data transfer is to be re-enabled. The transmitter 24, for instance, might include an equalizer that requires coefficients for its operation. Storing and later retrieving the coefficients that were being used when the transmitter was moved into its reduced power state reduces the amount of time required for the equalizer to resume operation. A memory for storing such parameters could be an internal memory within a component itself or provided separately.

Regarding parameters that might be stored, anything included in receiver feedback could potentially be of interest, for example. This could include any or all of the following types of feedback, which are periodically refreshed during normal operation of a receiver:

1) Offset control values;
2) Equalizer control loop coefficients, such as
   a. Decision feedback equalizer tap values
   b. Feed forward equalizer tap values
   c. Passive equalizer tap values;
3) Receiver phase select settings of relative clock/data phase;
4) Receiver voltage slicing levels;
5) VCO amplitude levels;
6) Driver pre-emphasis levels (if there is feedback);
7) Filter voltages passively stored to control the VCO frequency.

The items listed above are intended solely to illustrate examples of parameters that might be stored in some embodiments. This listing is in no way intended to be exhaustive. Any or all of the listed parameters, and possibly additional parameters or different parameters, could be stored in other embodiments.

The capacitor 38 (FIG. 1) actually represents a non-memory form of storage of a parameter. The control voltage at the input of the VCO 34 is effectively stored by the capacitor 38 when the VCO is moved into its reduced power state. When power to the VCO 34 is restored, the previous control voltage should provide a control voltage that is closer to the control voltage required for phase lock, and should thereby reduce the time required for phase lock relative to simply using 0V or some other default VCO control voltage value when starting the PLL 26. Reducing the phase lock time in this manner could make the VCO 34 a candidate component for being moved to a reduced power state when it otherwise might not be considered.

Periodically supplying power to a component of a data transfer module while the data transfer module is in the reduced power state is another option for reducing powering up time. The capacitor 38 is a useful example to illustrate this concept as well. Power could be periodically supplied to the capacitor 38 to prevent the "stored" VCO control voltage from dissipating while the VCO 34 is in its reduced power state.

A further possible action to reduce powering up time would be to lock the receiver 64 to a local reference frequency in the absence of data input, which would be the case when the receiver is in its reduced power state. In this state, the receive PLL 66 might function similarly to the transmit PLL 26 including a PFD in the loop, although the PFD would be supplied with the local reference signal since no data is being received. The receive PLL 66 then locks to the local reference signal.

This should result in a faster lock to received data when normal operations are to resume and data is again being received, since the local reference frequency would be close to the received data rate. Such local reference locking could be executed periodically, by supplying power to the PLL at certain intervals as described above instead of continuously. An additional switch, controlled by the local controller of a data transfer module, could be used to select between received data and the local reference signal for input to the PFD in the receive PLL 66. Any of various techniques could be used to generate the local reference signal. A crystal oscillator and divider, for example, is one commonly used arrangement. The local reference signal, or at least a local oscillator, might already be available in a communication device or communication equipment, since reference signals are sometimes generated locally for other purposes.

Figure 3:
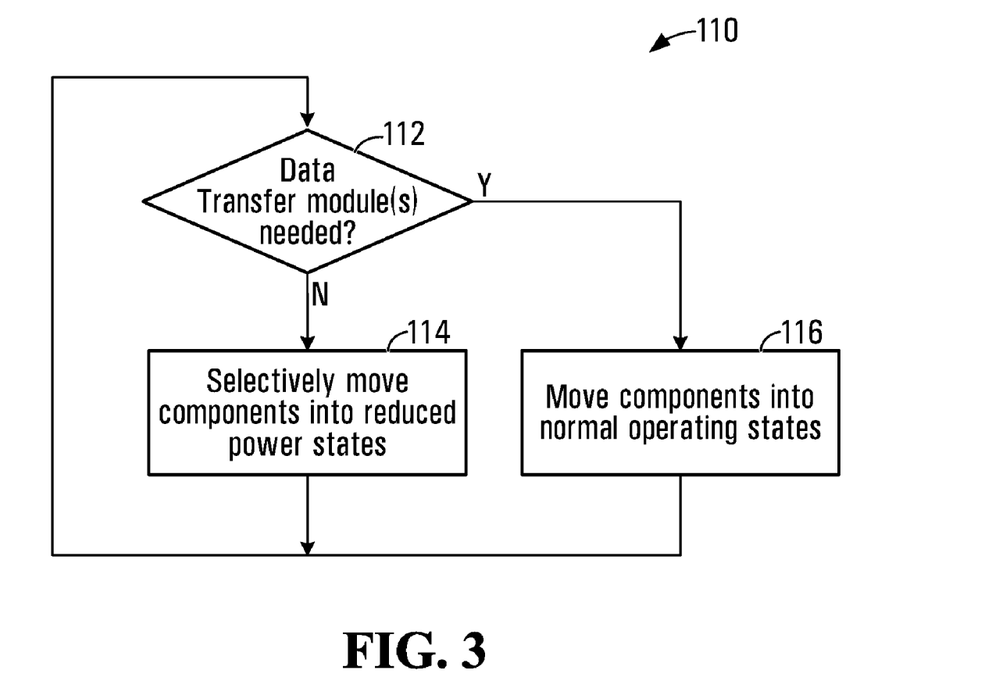
FIG. 3 is a flow diagram illustrating an example method according to another embodiment.

Embodiments have been described above primarily in the context of examples of apparatus. FIG. 3 is a flow diagram illustrating an example method according to another embodiment.

The method 110 involves determining at 112 whether a data transfer module is to be used in transferring data. As shown, this determination may be made for one or more data transfer modules. If a data transfer module is not to be used in transferring data, then components of that data transfer module are selectively moved into their reduced power states at 114, based on their respective timing characteristics, if this has not already been done in response to an earlier determination. Otherwise, components of a data transfer module are moved into their normal operating states at 116, if necessary. If a data transfer module is already operational, then its components are in their normal operating states and the operation at 116 need not be performed. The method 110 may be ongoing, in order to react to changing conditions.

FIG. 3 illustrates one embodiment. Other embodiments may include further, fewer, or different operations performed in a similar or different order. For example, control information might be sent to a far end of a connection if a data transfer module is not to be used in transferring data, and actions to reduce powering up times and/or the effects of power supply switching may be performed in some embodiments.

Further variations in the operations performed, and/or the ways in which operations are performed, may also be or become apparent. At least some of possible variations will be evident from FIGS. 1 and 2 and the foregoing descriptions thereof.

Figure 4:
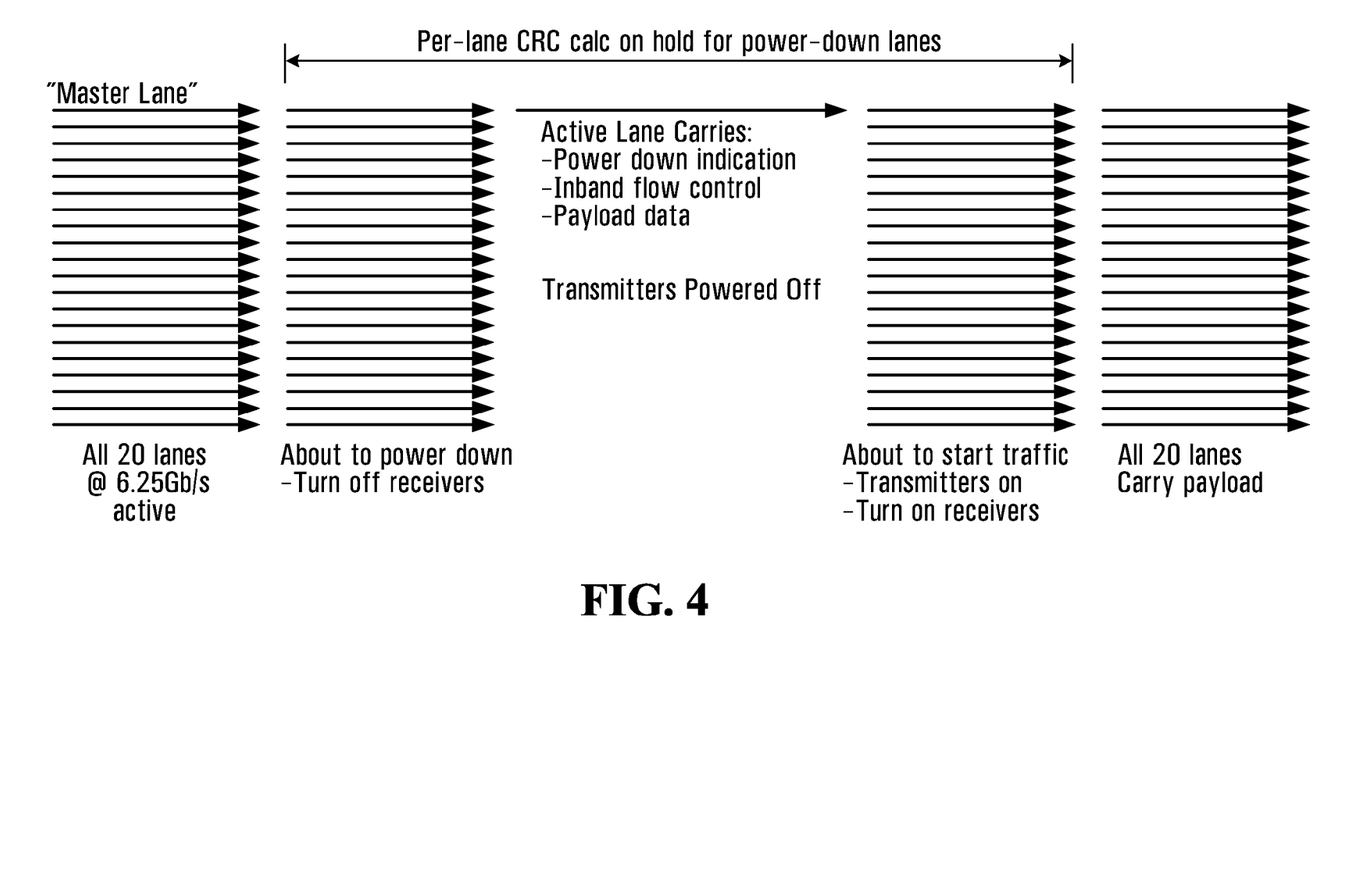
FIG. 4 represents an on/off sequence for an example application of an embodiment.

Various embodiments have been described in detail above. FIG. 4 represents an on/off sequence for an example application of an embodiment to a multiple-lane interface which operates in accordance with the Interlaken protocol. The Interlaken protocol is a joint specification of Cortina Systems and Cisco Systems, and is a scalable protocol specification for chip-to-chip packet transfers at rates scaling from 10 Gb/s to 100 Gb/s. It should be noted that applications to Interlaken are intended solely for the purposes of illustration. Embodiments may be implemented with other types of interfaces as well.

With reference to FIG. 4, 20 lanes operating at 6.25 Gb/s are shown. Other numbers of lanes are also possible, since the Interlaken protocol is scalable. The 20 lanes in the example shown include a master lane at the top of the drawing and 19 other lanes, which are slave lanes. Data packets are distributed across the active lanes for transmission.

At the left-hand side of the drawing, all 20 lanes are active. When a power reduction criterion, such as a low transmit queue level, is satisfied, some of the lanes can be shut down. At least some transmit and receive circuit components for those lanes are powered off in the example shown, and the master lane remains active.

As shown, the active master lane can be used to carry an initial power down indication or command to shut down slave lane receive circuits when the slave lanes are to be shut down, inband flow control information, and even payload data. The control information could be transmitted, for example, using one or more bits in a control word according to the Interlaken protocol. Regarding payload data, if a relatively small amount of data such as a single frame is received and is to be transmitted across the interface, the frame could potentially just be transmitted over the master lane, without re-enabling the other lanes. During this time, Cyclic Redundancy Check (CRC) calculations and other data-related operations for powered down lanes are on hold.

When a certain amount of transmit data is received or some other criterion to enable data transfer over the slave lanes is satisfied, control information which might include a command to turn on slave lane receive circuits is transmitted over the master lane, and slave lane transmit circuits are also turned on. This control information could similarly be transmitted using one or more bits in an Interlaken protocol control word.

As part of the process of re-enabling slave lane data transfer, the transmit circuits could send a training pattern or other information to the receive circuits. As shown at the right-hand side of the drawing, all 20 lanes are then again able to carry payload data.

In this example, one master lane is maintained in its normal operating state, and all other lanes are turned off and on together. However, it should be appreciated that there could be multiple master lanes and/or subsets of one or more slave lanes could be turned off and on. In some embodiments, where there is another mechanism to communicate control information, all lanes could potentially be shut down to reduce power consumption. Other possible variations may also be or become apparent.

Figure 5:
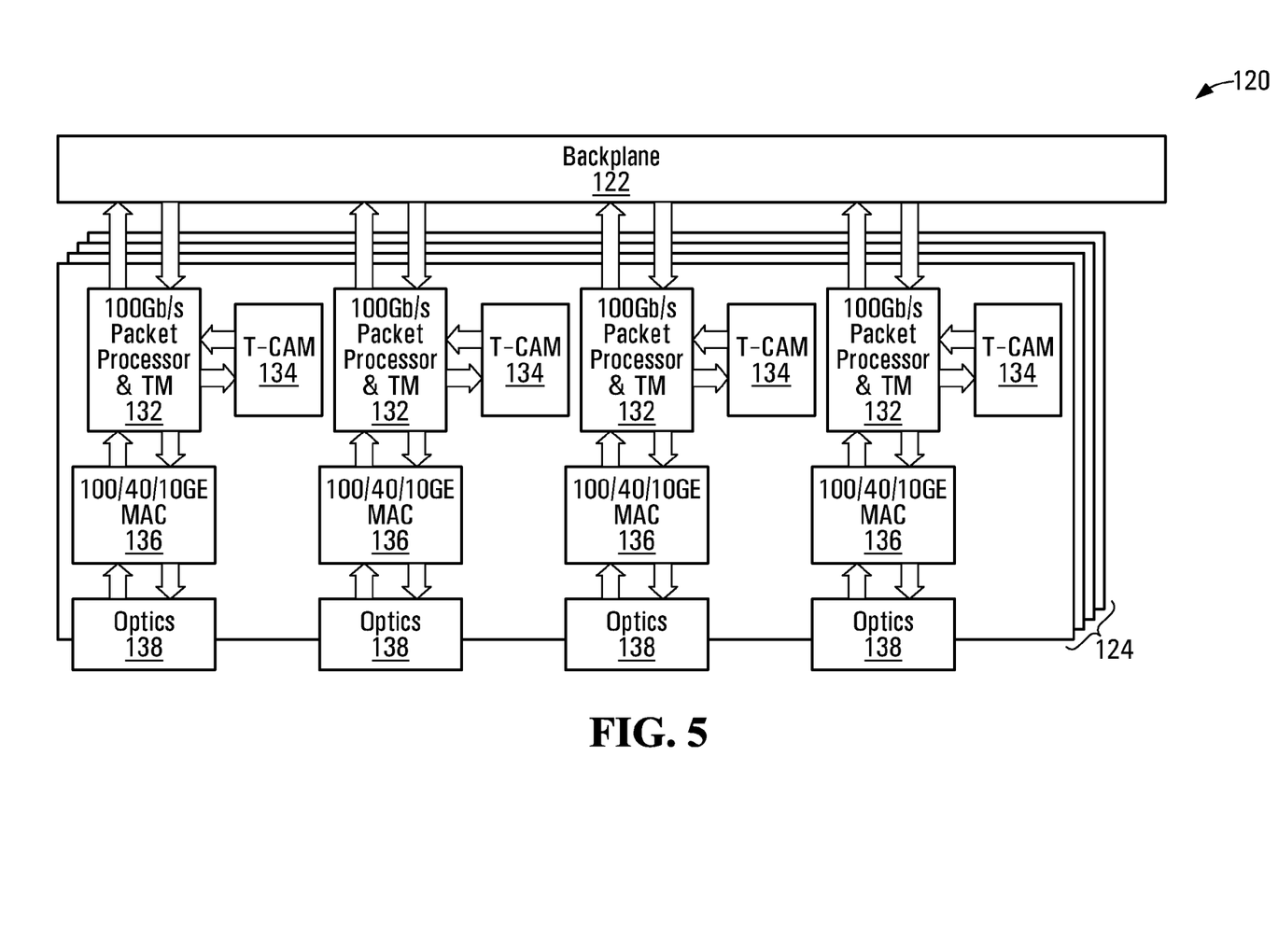
FIG. 5 is a block diagram of an example of communication equipment in conjunction with which embodiments could be implemented.

FIG. 5 is a block diagram of an example of communication equipment in conjunction with which embodiments could be implemented. The example communication equipment 120 includes a backplane 122 and line cards 124, one of which is shown in detail. Each of the line cards 124 includes multiple implementations of a packet processor and traffic manager (TM) 132, a Ternary Content Addressable Memory (T-CAM) 134, a Gigabit Ethernet (GE) Media Access Control (MAC) device 136, and an optical interface 138. Other line cards and communication equipment may have different structures than shown, and still be suitable for implementation of embodiments.

Considering the above example of the Interlaken protocol, such a chip-to-chip protocol might be used between the packet processors and TMs 132 and the backplane 122, between the MAC devices 136 and the packet processors and TMs, and/or between the packet processors and TMs and the T-CAMS 134, for instance.

For the purposes of illustration, consider the further example of 20 bidirectional Interlaken interfaces per line card 124 and 12 line cards per chassis. With 25% average 24-hour utilization and 2 W power consumption per interface, the potential daily power savings for one equipment chassis that could be realized by powering down lanes in accordance with an embodiment can be determined as follows:

2 W per interface*(100%−25% utilization)=1.5 W 1.5 W*20 interfaces per line card=30 W per line card 30 W per line card*20 line cards per chassis=360 W.

In some communication equipment, this represents about 15% of total power. The proportion of total potential power savings will vary by implementation, and the actual power savings realized will be dependent upon how aggressively components are powered down when not in active use.

What has been described is merely illustrative of the application of principles of embodiments. Other arrangements and methods can be implemented without departing from the scope of the invention.

For example, determinations relating to the usage of data transfer modules in transferring data could also or instead be based on historical data patterns and/or predicted data patterns, and need not be based only on current data volumes, priorities, or latency. Adding a predictive aspect might allow connections to be re-enabled in advance of an expected period of increased activity, for example.

It should also be noted that power supply switching need not necessarily be limited to on/off switching. Power supply to components could instead be "dialed" down and up as components are moved between their normal operating states and their reduced power states.

In addition, although described primarily in the context of methods and systems, other implementations are also contemplated, as instructions stored on a computer-readable medium, for example.

We claim:

1. An apparatus comprising:
a data transfer module that enables transfer of data, the data transfer module comprising components that have respective timing characteristics indicative of a powering up time for each component to transition between a reduced power state of the component and a normal operating state of the component; and
a controller that determines whether the data transfer module is to be used in transferring data and selectively moves each component of the data transfer module that has a powering up time that is less than a threshold into its reduced power state in response to a determination that the data transfer module is not to be used in transferring data.

2. The apparatus of claim 1, wherein the respective timing characteristics are further indicative of a powering down time to move each component from its normal operating state to its reduced power state, and wherein the controller selectively moves each component of the data transfer module that has a respective total powering down time and powering up that is less than a threshold into its reduced power state.

3. The apparatus of claim 1, wherein the controller determines whether the data transfer module is to be used in transferring data based on control information received from a further controller.

4. The apparatus of claim 3, wherein the data transfer module comprises a receive circuit, and wherein the controller receives the control information from the further controller through the receive circuit.

5. The apparatus of claim 1, wherein the data transfer module comprises a transmit circuit, and wherein the controller, in response to a determination that the data transfer module is not to be used in transferring data, transmits control information to a remote controller to cause the remote controller to move a receive circuit that is operatively coupled to the transmit circuit into a reduced power state and selectively moves each component of the transmit circuit that has a powering up time that is less than a threshold into its reduced power state after the control information is transmitted to the remote controller.

6. The apparatus of claim 5, wherein the control information is transmitted to the remote controller using an Interlaken protocol that comprises a scalable protocol specification for chip-to-chip packet transfers.

7. The apparatus of claim 1, wherein the data transfer module comprises a transmit circuit and a receive circuit, and wherein the controller selectively moves each component of the transmit circuit and the receive circuit that has a powering up time that is less than a threshold into its reduced power state in response to a determination that the data transfer module is not to be used in transferring data.

8. The apparatus of claim 1, wherein the timing characteristics reflect an action that is taken to reduce a powering up time of a component from its reduced power state to its normal operating state.

9. The apparatus of claim 1, wherein the data transfer module is one of a plurality of data transfer modules that enables transfer of data, each data transfer module of the plurality of data transfer modules comprising components having respective timing characteristics indicative of a powering up time for each component to transition between a reduced power state of the component and a normal operating state of the component, and wherein the controller determines whether each data transfer module is to be used in transferring data and selectively moves each component, of each data transfer module that is not to be used in transferring data, that has a powering up time that is less than a threshold, into its reduced power state.

10. The apparatus of claim 9, wherein the controller comprises a central controller, and wherein the apparatus further comprises:
respective local controllers operatively coupled to the plurality of data transfer modules, each local controller being further operatively coupled to the central controller and responsive thereto to selectively move each component, of the data transfer module to which the local controller is operatively coupled, that has a powering up time that is less than a threshold, into its reduced power state in response to a determination by the central controller that the data transfer module is not to be used in transferring data.

11. The apparatus of claim 10, wherein the central controller determines whether each data transfer module is to be used in transferring data and transmits control information to the local controller of each data transfer module that is not to be used in transferring data, and wherein the local controller of each data transfer module that is not be used in transferring data is responsive to the control information to selectively move each component of the data transfer module that has a powering up time that is less than a threshold into its reduced power state.

12. The apparatus of claim 10, wherein the plurality of data transfer modules comprises data transfer modules having respective transmit circuits, and wherein each local controller that is operatively coupled to a data transfer module having a transmit circuit is responsive to the central controller to to transmit control information to a remote controller to cause the remote controller to move a remote receive circuit that is operatively coupled to the transmit circuit into a reduced power state, and to selectively move each component of the transmit circuit that has a powering up time that is less than a threshold into its reduced power state.

13. The apparatus of claim 9, wherein the controller maintains the components of at least one of the data transfer modules in their normal operating states.

14. The apparatus of claim 9, wherein the data transfer modules operate in accordance with a protocol that comprises a scalable protocol specification for chip-to-chip packet transfers.

15. The apparatus of claim 9, wherein the controller subsequently determines when each data transfer module is to be used in transferring data, and moves components of each data transfer module that was previously not to be used in transferring data but is subsequently to be used in transferring data from their reduced power states to their normal operating states.

16. The apparatus of claim 15, wherein the controller further controls a sequence in which components are moved from their reduced power states to their normal operating states.

17. The apparatus of claim 1, wherein the components that have respective timing characteristics comprise one or more of:
a transmitter;
a multiplexer operatively coupled to the transmitter;
a transmit Phase Lock Loop (PLL) operatively coupled to the multiplexer and to the transmitter;
a voltage-controlled oscillator (VCO) in the transmit PLL;
a receiver;
a demultiplexer operatively coupled to the receiver;
a receive PLL operatively coupled to the demultiplexer and to the receiver; and
a VCO in the receive PLL.

18. The apparatus of claim 1, wherein the components that have respective timing characteristics comprise transmit circuit components that enable transmission of packet data from the apparatus, the transmit circuit components comprising: a transmitter; a multiplexer operatively coupled to the transmitter; and a transmit Phase Lock Loop (PLL) operatively coupled to the multiplexer and to the transmitter.

19. The apparatus of claim 1, wherein the data transfer module enables transfer of data from and to the apparatus, wherein the data transfer module further comprises one or more switches coupled to the components, wherein the controller determines whether the data transfer module is to be used in transferring data and selectively moves each of the components of the data transfer module into the reduced power state by control of the one or more switches based on the respective powering up time and transmission of data from one or more transmit queues coupled to the components and the controller.

20. A method comprising:
determining whether a data transfer module, which enables transfer of data and comprises components that have respective timing characteristics indicative of a powering up time for each component to transition between a reduced power state of the component and a normal operating state of the component, is to be used in transferring data; and
selectively moving each component of the data transfer module that has a powering up time that is less than a threshold into its reduced power state in response to a determination that the data transfer module is not to be used in transferring data.

21. The method of claim 20, further comprising:
receiving control information,
wherein determining comprises determining whether the data transfer module is to be used in transferring data based on the received control information.

22. The method of claim 21, wherein the data transfer module comprises a receive circuit, and wherein receiving comprises receiving the control information through the receive circuit.

23. The method of claim 20, wherein the data transfer module comprises a transmit circuit, and wherein the method further comprises, in response to determining that the data transfer module is not to be used in transferring data:
transmitting control information to cause a remote receive circuit that is operatively coupled to the transmit circuit to be moved into a reduced power state; and selectively moving each component of the transmit circuit that has a powering up time that is less than a threshold into its reduced power state after transmitting the control information.

24. The method of claim 23, wherein transmitting comprises transmitting the control information using a protocol that comprises a scalable protocol specification for chip-to-chip packet transfers.

25. The method of claim 20, further comprising:
performing an action to reduce a powering up time of a component from its reduced power state to its normal operating state.

26. The method of claim 20, wherein the data transfer module is one of a plurality of data transfer modules that enables transfer of data, each data transfer module of the plurality of data transfer modules comprising components having respective timing characteristics indicative of a powering up time for each component to transition between a reduced power state of the component and a normal operating state of the component, wherein determining comprises determining whether each data transfer module is to be used in transferring data, and wherein selectively moving comprises selectively moving each component, of each data transfer module that is not to be used in transferring data, that has a powering up time that is less than a threshold, into its reduced power state.

27. The method of claim 26, further comprising:
maintaining the components of at least one of the data transfer modules in their normal operating states.

28. The method of claim 26, wherein the data transfer modules operate in accordance with an Interlaken protocol that comprises a scalable protocol specification for chip-to-chip packet transfers.

29. The method of claim 26, further comprising:
determining when each data transfer module is to be used in transferring data; and
moving components of each data transfer module that was previously not to be used in transferring data but is subsequently to be used in transferring data from their reduced power states to their normal operating states.

30. The method of claim 29, wherein moving components from their reduced power states to their normal operating states comprises controlling a sequence in which the components are moved from their reduced power states to their normal operating states.

31. An apparatus comprising:
means for determining whether a data transfer module, which enables transfer of data and comprises components that have respective timing characteristics indicative of a powering up time for each component to transition between a reduced power state of the component and a normal operating state of the component, is to be used in transferring data; and
means for selectively moving each component of the data transfer module that has a powering up time that is less than a threshold into its reduced power state in response to a determination that the data transfer module is not to be used in transferring data.

32. An apparatus comprising:
a data transfer module that enables transfer of data; and
a controller that determines whether the data transfer module is to be used in transferring data and, in response to a determination that the data transfer module is not to be used in transferring data, moves the data transfer module into a reduced power state and performs an action to reduce a powering up time of the data transfer module in response to a determination that the data transfer module is subsequently to be moved from the reduced power state to a normal operating state for use in transferring data, wherein the action comprises one or more of: storing one or more parameters used by a component of the data transfer module prior to moving the data transfer module from the normal operating state to the reduced power state, and periodically supplying power to a component of the data transfer module while the data transfer module is in the reduced power state.

33. An apparatus comprising:
a multi-connection interface supporting transmission of data over multiple connections; and
a controller that determines whether transmission of data over any of the multiple connections can be disabled, and, in response to a determination that transmission of data over any of the multiple connections can be disabled, disables transmission of data over one or more of the connections, maintains at least one of the connections in an enabled state for transmission of data, and transmits control information through the enabled connection to a remote interface that is operatively coupled to the interface through the multiple connections, the control information causing reception of data over the one or more connections to be disabled at the remote interface.

34. The apparatus of claim 33, wherein the controller further determines when transmission of data over any of the multiple connections for which transmission of data has been disabled should be enabled, and, in response to a determination that transmission of data over any of the multiple connections for which transmission of data has been disabled should be enabled, transmits control information through the enabled connection to the remote interface and enables transmission of data over each connection that should be enabled, the control information causing reception of data, over each connection for which transmission of data is enabled, to be enabled at the remote interface.

35. The apparatus of claim 33, wherein the controller disables transmission of data over a plurality of the multiple connections by moving each data transfer module of a plurality of data transfer modules respectively operatively coupled to the plurality of connections into one of multiple reduced power states.

36. An apparatus comprising:
a data transfer module that enables transfer of data, the data transfer module comprising components that have respective timing characteristics indicative of a time for each component to transition between a reduced power state of the component and a normal operating state of the component and respective power consumption characteristics indicative of power consumption of each component; and
a controller that determines whether the data transfer module is to be used in transferring data and selectively moves components of the data transfer module into their reduced power states based on the respective timing characteristics and the respective power characteristics in response to a determination that the data transfer module is not to be used in transferring data.

37. The apparatus of claim 36, wherein the respective power consumption characteristics are indicative of at least one of: power consumption of each component when the data transfer module is not transferring data, and power consumption of each component to move the component from its reduced power state to its normal operating state.

38. The apparatus of claim 37, wherein the controller moves components of the data transfer module from their reduced power states to their normal operating states in response to a determination that the data transfer module is subsequently to be used in transferring data.

39. The apparatus of claim 38, wherein the controller further controls a sequence in which components are moved from their reduced power states to their normal operating states based on the respective power consumption characteristics.

* * * * *

UNITED STATES PATENT AND TRADEMARK OFFICE
CERTIFICATE OF CORRECTION

| | |
|---|---|
| PATENT NO. | : 8,135,972 B2 |
| APPLICATION NO. | : 12/401020 |
| DATED | : March 13, 2012 |
| INVENTOR(S) | : Fredrik Olsson et al. |

It is certified that error appears in the above-identified patent and that said Letters Patent is hereby corrected as shown below:

In the Claims:

Column 13, claim 12, line 47, "...to to..." should read --...to...--.

Signed and Sealed this
Fourth Day of September, 2012

David J. Kappos
*Director of the United States Patent and Trademark Office*